UNITED STATES PATENT OFFICE.

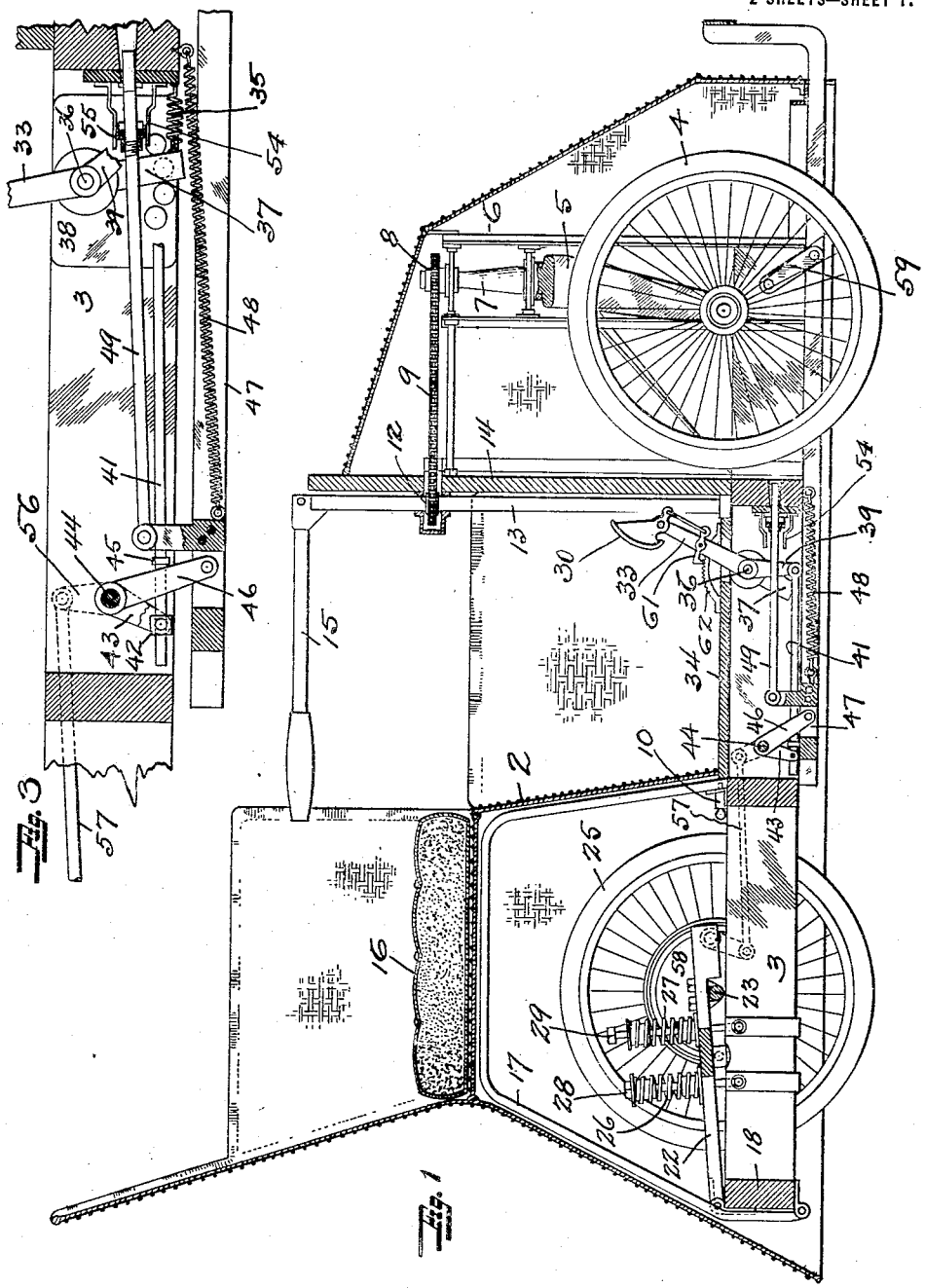

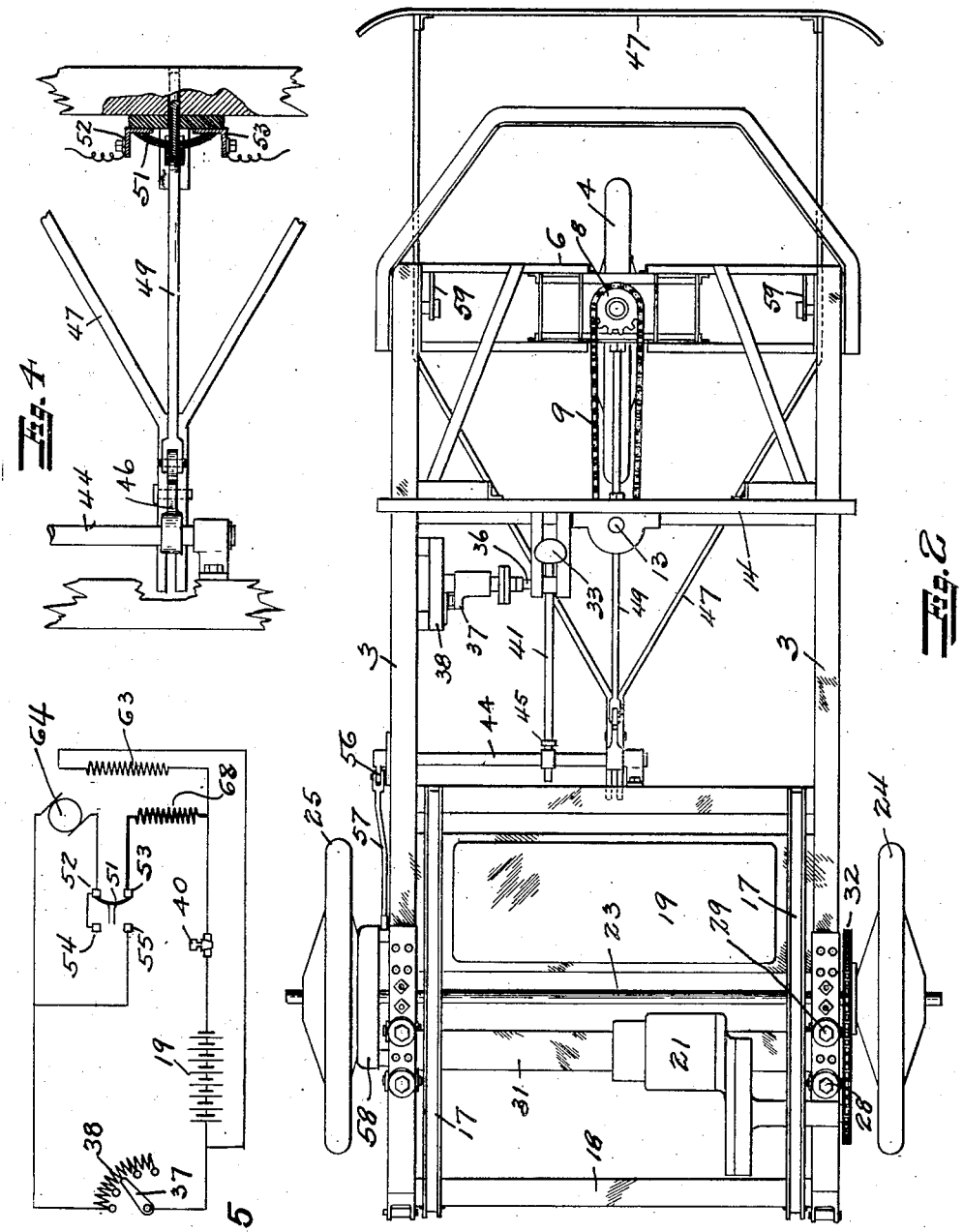

GRAHAME B. RIDLEY, OF SAN FRANCISCO, CALIFORNIA.

MOTOR-VEHICLE.

1,239,219.　　　　Specification of Letters Patent.　　Patented Sept. 4, 1917.

Application filed December 14, 1915. Serial No. 66,750.

*To all whom it may concern:*

Be it known that I, GRAHAME B. RIDLEY, a subject of Great Britain, and a resident of the city and county of San Francisco, State of California, have invented a certain new and useful Motor-Vehicle, of which the following is a specification.

The invention relates to motor vehicles and particularly to that type of vehicle known as a motor chair.

An object of the invention is to provide means for stopping the movement of the vehicle when it comes in contact with an extraneous object.

Another object of the invention is to provide an improved system of control of the vehicle.

A further object of the invention is to provide an improved form of spring suspension for the vehicle body.

The invention possesses other advantageous features, some of which, with the foregoing, will be set forth at length in the following description, where I shall outline in full that form of the invention which I have selected for illustration in the drawings accompanying and forming part of the present specification. In such drawings, I have shown only one specific form of my generic invention, but it is to be understood that the invention may be embodied in a multiplicity of forms, each being a species of my invention.

Referring to said drawings:

Figure 1 is a vertical longitudinal section of the motor vehicle of my invention.

Fig. 2 is a plan or top view of the chassis of the vehicle of my invention.

Fig. 3 is a detail in vertical section of a portion of the control mechanism of the vehicle.

Fig. 4 is a detail in plan showing a portion of the control mechanism, part thereof being shown in section.

Fig. 5 is a diagrammatic representation of one form of electric circuit for the vehicle.

The vehicle of my invention comprises an electrically driven chair which is driven by current derived from a storage battery carried on the vehicle and intended primarily for slow speed travel. The body 2 of the vehicle is preferably made in the form of a chair and may be constructed of any desirable material, such as wood, steel or wicker. The frame or chassis of the vehicle comprises the side rails 3 which are suitably connected together by cross rails to give the frame the desired rigidity. The vehicle is provided adjacent its forward end with a guiding wheel 4, which is mounted in the fork 5, the shank of which is journaled in the frame 6, which is rigidly secured to the side rails 3. The prongs of the fork incline backwardly, so that the axis of the wheel lies behind the axis of the shank, thereby tending to hold the wheel in the straight ahead position. Secured to the shank 7 is a sprocket 8 which is engaged by a chain 9 which also engages a sprocket 12 on the steering column 13, which is arranged adjacent to the dash 14. Pivoted to the upper end of the steering column, so that it has movement in a vertical arc independent of the steering column, is a steering handle 15, the free end of which is disposed adjacent the driver's seat 16. The sprocket 8 is preferably larger in diameter than sprocket 12 so that the movement of the handle through a given angle produces a movement of the fork through a lesser angle, thereby preventing the guiding wheel from being moved into too sharp an angle with the longitudinal axis of the vehicle.

The body 2 is supported upon the bent frame, preferably formed of channel irons 17 which are hinged at their rear ends to the bottom of the rear cross rail 18, so that the body may be readily tilted back to give access to the storage battery 19 and driving motor 21 which are arranged therebeneath. A latch 10 secures the forward end of the hinged body to the frame, so that the body may not be accidentally tilted backward. The storage battery is carried on a cross frame or board which is secured to the side rails of the frame. Pivotally attached to the side rails 3 at their rear ends are bars 22, to which is secured the axle 23 of the rear wheels 24 and 25. The bars 22 are held adjacent the side rails by a plurality of springs 26 and 27 whose compression varies with the load in the vehicle, the springs being interposed between the running gear and the vehicle frame. Pivoted to the side rails 3 and extending through apertures in the bars 22 are bolts 28 and 29, between the heads of which and the bars are arranged the springs 26 and 27, which are compressed as the vehicle frame moves downward. The bolt 29 is longer than the bolt 28, and the springs are of the same length, so that for a light load only the spring 26 is compressed and for a heavier load, both springs are compressed. By this construction the spring resistance varies in proportion to the load, producing an easier riding vehicle than if only one stiff spring were employed. The motor 21 is mounted on a cross rail 31 which is secured to the bars 22 so that the position of the motor with respect to the axle 23 is not varied. The motor is connected to the drive wheel 24 through suitable gearing and the chain 32. The motor is preferably of the compound wound constant speed type, so that the speed of the vehicle when operating is substantially constant, regardless of variations in the load on the motor.

The motor is controlled by a suitable lever, which may be either operated by hand or by the foot and in the embodiment shown in the drawings, the motor is controlled by the foot-lever or pedal 33, which is pivoted below the floor board 34 and which is normally held in the backward position by the spring 35. The pedal is secured to the shaft 36 which is attached to the arm 37 of the rheostat or controller 38, backward movement of the pedal serving to gradually cut out the resistance of the rheostat, so as to allow the motor sufficient time to gain speed. Means are provided for locking the pedal in the forward position so that the driver may leave the vehicle or be relieved from the fatigue of holding the pedal depressed when the vehicle is stationary. The foot plate 30 is pivoted to the pedal lever 33 and connected to the foot plate is a latch 61 which is arranged to engage the curved rack bar 62 secured to the floor board 34. A forward rocking movement of the foot plate operates to release the latch to permit the pedal to be moved and a backward rocking movement of the foot plate causes the latch to engage the rack.

Braking means are also operated by the pedal, the movement of the pedal forward to a given position serving to operate the rheostat arm and a further forward movement of the pedal serving to short-circuit the armature. Further forward movement of the pedal causes a mechanically operated brake to be applied. Secured to the shaft 36 is a lever 39, to the free end of which is pivotally attached a rod 41 which slides in a block 42 attached to the free end of lever 43, which lever is secured to the shaft 44. Secured to the rod 41, is a collar or abutment 45 which, on the forward movement of the pedal, engages the block 42 and produces a rotation of the shaft 44. Secured to the shaft 44 is a lever 46 which is pivoted at its free end to the frame 47 which is normally held in its forward position by the spring 48. Forward movement of the pedal, therefore, to the proper position causes a backward movement of the frame 47. Pivoted to the frame 47 is a rod 49 which carries on its forward end a brush or conductor 51, which normally closes the circuit between two insulated terminals 52—53 in the motor circuit. Backward movement of the frame 47, therefore, first operates the circuit breaker to open the motor circuit. Arranged adjacent the terminals 52—53 and insulated from each other are resilient contacts 54—55, which are connected to the motor in such manner that the closing of the circuit through these terminals will cause the motor to operate as a brake, in the present instance by short-circuiting the armature. Further backward movement of the frame 47 brings the brush 51 into contact with the resilient terminals 54—55 and closes the circuit therethrough. In the present construction, the contact 52 is connected to one side of the armature 64 and the contact 53 to the series field winding 68, so that when the brush 51 opens the circuit at these contacts the armature and series field are open circuited. The contact 54 is connected to the contact 52, and contact 55 is connected to the opposite side of the armature so that when the circuit is closed at contacts 54—55, the armature is short-circuited. The shunt field 63 is constantly excited except when the plug or switch 40 in the battery circuit is operated to open the circuit.

The electric brake is the service brake and the mechanically operated brake is designated as the emergency brake, since it is intended to be used only for quick stopping. Secured to shaft 44 is a lever 56 which is connected by the link 57 with the arm of an expanding or contracting band brake arranged in the drum 58 on wheel 25. This brake mechanism is so arranged that the band does not engage the drum unless the pedal is moved forward beyond the position at which the electric brake is thrown into operation.

Means are also provided for stopping the vehicle in the event that it strikes an extraneous object. The frame 47 extends forward beyond the side rails forming a guard, and is mounted adjacent its forward end on links 59 so that it is capable of being moved backward against the force of the spring 48. When the vehicle comes in contact with an extraneous object, the frame 47 is depressed, the backward movement of the frame causing the operation of the circuit breaker to open the motor circuit and to close the electric braking circuit. A further backward movement of the frame will cause a further rotation of the shaft 44 and result in the application of the emergency brake.

When it is desired to leave the vehicle, the pedal is depressed to apply the brake and latched in such position, and when the vehicle is to be left standing for any considerable length of time the switch 40 is opened to completely open the battery circuit.

Upon reëntering the vehicle, the switch is closed and then the pedal unlatched and allowed to move backward to cause the introduction of current into the motor armature.

I claim:

1. In a motor vehicle, a motor, a motor circuit, a circuit breaker in the motor circuit, a lever, means operative by the first portion of the lever movement for progressively increasing the resistance of said circuit, means operative by a succeeding portion of the lever movement for opening said circuit breaker, and means independent of the motor circuit for opening said circuit breaker.

2. In a motor vehicle, a motor, a motor circuit, a circuit breaker in the motor circuit, a lever, means operative by the first portion of the lever movement for progressively increasing the resistance of said circuit, and means mediately connected to said lever and operative by a succeeding portion of the lever movement for opening said circuit breaker and short-circuiting said motor circuit.

3. In a motor vehicle, a motor, a motor circuit, a circuit breaker in the motor circuit, a lever, means operative by the first portion of the lever movement for progressively increasing the resistance of said circuit, means operative by a succeeding portion of the lever movement for opening said circuit breaker and short-circuiting said motor circuit, and means operative by a final movement of the lever for mechanically braking said vehicle.

4. In a motor vehicle having a friction brake, a motor, a motor circuit, a circuit breaker in the motor circuit, a lever, means operative by a portion of the lever movement for progressively increasing the resistance of said circuit, means operative by a succeeding movement of the lever for opening said circuit breaker, means operative by a final movement of the lever for setting said friction brake, and means independent of the lever for opening said circuit breaker.

5. In a motor vehicle, a motor, a motor circuit, a controller for said motor, a circuit breaker in the motor circuit, a friction brake and a lever arranged to operate the controller through a portion of its movement, to operate the circuit breaker through its further movement and to operate the friction brake through its final movement.

6. In a motor vehicle provided with a friction brake, a motor, a controller and a circuit breaker, and unitary mechanism for successively operating the controller, opening the circuit breaker and operating the friction brake.

7. In a motor vehicle, a motor, a controller therefor, a lever for operating the controller, a circuit connected to opposite sides of the motor armature, a conductor for closing said circuit, a rock shaft connected to said conductor adapted by its movement to close the armature short circuit, a lever on said rock shaft and a sliding connection between said levers.

In testimony whereof, I have hereunto set my hand at San Francisco, California, this 2nd day of December 1915.

GRAHAME B. RIDLEY.

In presence of—
H. G. PROST.